(No Model.)

M. J. CLARK.
COFFEE ROASTER.

No. 331,615.            Patented Dec. 1, 1885.

WITNESSES:  
Robert Kirk  
C. D. Zerbe

INVENTOR:  
Matthew J. Clark.  
By J. S. Zerbe  
Attorney.

UNITED STATES PATENT OFFICE.

MATTHEW J. CLARK, OF CLERMONTVILLE, OHIO.

COFFEE-ROASTER.

SPECIFICATION forming part of Letters Patent No. 331,615, dated December 1, 1885.

Application filed May 13, 1885. Serial No. 165,370. (No model.)

*To all whom it may concern:*

Be it known that I, MATTHEW J. CLARK, of Clermontville, in the county of Clermont and State of Ohio, have invented a new and useful Improvement in Coffee-Roasters, which improvement is fully set forth in the following specification and accompanying drawings, in which—

Figure 1:
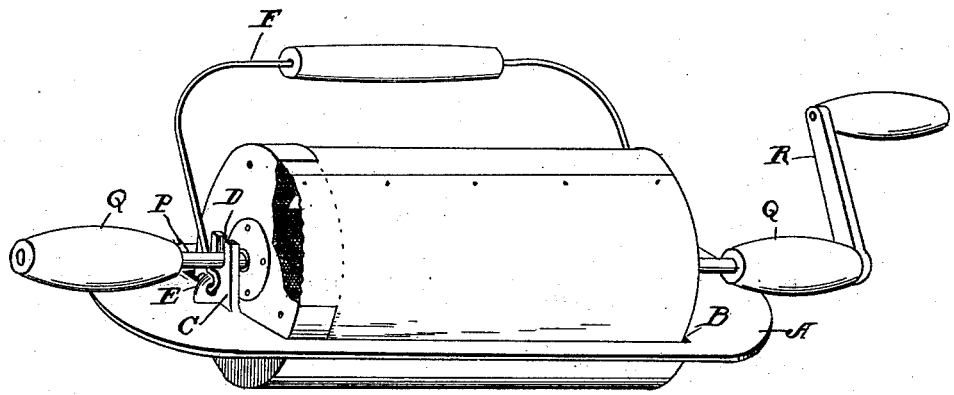
Figure 2:
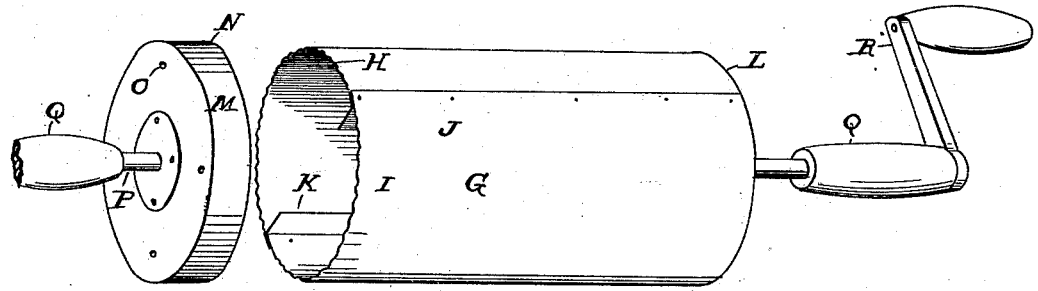

Figure 1 is a perspective view, with the cylinder partly cut away, of my improved coffee-roaster; and Fig. 2 a perspective view of the cylinder with one of the heads detached with a portion cut away, so as to expose the interior.

The present invention relates to an improvement in coffee-roasters in which I provide a heater having therein a cylinder journaled within ears, the cylinder being formed with one of the heads detachable and having therein a series of openings, the periphery of the cylinder formed in sections with a flange formed integral with the inner end, each of these sections extending into the cylinder, so as to agitate the coffee when the said cylinder is being rotated.

In the accompanying drawings, A represents a metallic heater, preferably somewhat oblong and designed to fit the opening in the top of the stove, having centrally therein a semicircular depression, B. The ends of this depression are provided with vertical lugs C, having recesses D in the upper part, and outwardly from these lugs C re-enforcing wings E, having therein openings whereby the bail F is attached.

Within the depression B of the heater I provide a sheet-metal cylinder, G. (Shown detached in Fig. 2.) The shoulder of this cylinder is preferably formed in two sections, H and I, overlapping and secured together by means of rivets J. Each of the inner sections of the lap forming the joint is turned inwardly longitudinally, forming flanges K on the inner sides of the cylinder. These flanges may extend inwardly as far as found convenient, to be used in agitating the coffee while the cylinder is rotated.

It is obvious that the cylinder can be formed with any number of sections and corresponding flanges; but for various reasons I prefer the cylinder formed with two sections and two flanges. The ends of this cylinder are provided with heads L and M, one of them, M, formed with a flange, N, so as to fit on the end of the said cylinder and be readily detachable. One or both of these heads is designed to be provided with openings O therein, for the purpose of ventilating the cylinder and permitting the examination of the coffee by sight or sound, to ascertain whether it is properly roasted, if so desired. Each of these heads is provided with an axis, P, to rest within the openings D of the lugs C and extend outwardly, where they are provided with spiral threads Q, to receive therein wooden handles screwed thereon, so that the said cylinder may be removed from the heater when it is desired to fill the empty device. One of these axes is provided outwardly from the handle Q with a crank, R, whereby the cylinder is revolved.

As will be noticed, when the cylinder is removed from the heater the said heater may be removed from the stove or heating device by means of the bail F.

In filling the cylinder the head is removed and a quantity of coffee or other material to be roasted is placed within the cylinder and the head replaced, after which the cylinder can be connected with the heater and revolved by means of a crank.

The flange K within the heater serves to agitate the material, and thus brown it evenly.

What I claim as new is—

In a coffee-roaster, the metallic cylinder formed of separate longitudinal sections and riveted together, each section provided with an inwardly-projecting flange formed integral with the section and one of the ends of the cylinder formed with a detachable head, substantially as herein set forth.

In testimony that I claim the foregoing I have hereunto set my hand, this 27th day of April, 1885, in the presence of witnesses.

MATTHEW J. CLARK.

Witnesses:
FRANK R. FRIDMAN,
GEO. H. FRIDMAN.